United States Patent [19]
Kools et al.

[11] Patent Number: 5,481,808
[45] Date of Patent: Jan. 9, 1996

[54] VEHICLE ORIENTATION SENSOR AND METHOD WITH MAGNETIC STABILIZATION

[75] Inventors: Jacques C. S. Kools; Josef P. M. Naus; Wiepke Folkerts; Martinus A. M. Gijs, all of Eindhoven, Netherlands

[73] Assignee: U.S. Philips Corporation, New York, N.Y.

[21] Appl. No.: 422,664

[22] Filed: Apr. 10, 1995

Related U.S. Application Data

[63] Continuation of Ser. No. 305,860, Sep. 14, 1994, abandoned, which is a continuation of Ser. No. 29,820, Mar. 11, 1993, abandoned.

[30] Foreign Application Priority Data

Apr. 9, 1992 [EP] European Pat. Off. .............. 92201018

[51] Int. Cl.⁶ .................................................. G01C 17/38
[52] U.S. Cl. ............................. 33/357; 33/361; 361/149
[58] Field of Search .............................. 33/356, 357, 361, 33/355 R; 324/225, 244; 361/149, 157, 261

[56] References Cited

U.S. PATENT DOCUMENTS

| | | | |
|---|---|---|---|
| 4,060,845 | 11/1977 | Bowers et al. | 361/149 |
| 4,358,886 | 11/1982 | Matsumoto et al. | 361/149 X |
| 4,378,581 | 3/1983 | Kuno et al. | 361/149 |
| 4,388,666 | 6/1983 | Kuno et al. | 361/149 |
| 4,416,067 | 11/1983 | Scherer et al. | |
| 4,429,469 | 2/1984 | Tsushima et al. | |
| 4,523,386 | 6/1985 | Matsumoto et al. | 333/357 |

FOREIGN PATENT DOCUMENTS 0179212 8/1991 Japan ........................................ 33/356

*Primary Examiner*—Alvin Wirthlin
*Attorney, Agent, or Firm*—Robert J. Kraus

[57] ABSTRACT

A device for determining the orientation of a vehicle includes a magnetic field sensor (3) which is arranged in the vicinity of a ferromagnetic outer wall of the body of the vehicle and which is rigidly connected to the wall. External magnetic fields could unpredictably magnetize the wall portion (1) of the body, in the vicinity of which the magnetic field sensor (3) is provided, so that the measurements would become inaccurate. In order to achieve a substantial reduction of these adverse effects of external magnetic fields, the relevant wall portion is magnetically stabilized, preferably by including it in a magnetic circuit which also includes at least a magnet (11; 23, 27). The magnetic circuit preferably comprises also a yoke (23, 25) which has an approximately U-shaped cross-section and which is made of a soft magnetic material, the free ends of limbs (25) of the yoke facing the relevant wall portion (1) and the yoke being at least partly enclosed by an electric coil (27) in order to form an electromagnet.

6 Claims, 2 Drawing Sheets

VEHICLE ORIENTATION SENSOR AND METHOD WITH MAGNETIC STABILIZATION

This is a continuation of prior application Ser. No. 08/305,860, filed on 14 Sep. 1994, now abandoned which is a continuation of prior application Ser. No. 08/029,820, filed on 11 Mar. 1993, now abandoned.

BACKGROUND OF THE INVENTION

The invention relates to a device for determining the orientation of a vehicle having an at least partly ferromagnetic body, comprising a magnetic field sensor which is arranged in the vicinity of an outer wall of the body and which is rigidly connected to said outer wall.

An example of such a device is known from EP-B-0 067 337. The known device is based on the assumption that the soft magnetic parts of the metal body of the vehicle bundle the lines of force of the terrestrial magnetic field and hence contribute to more accurate measurement of this field. In this respect it is assumed that the effect of disturbing magnetic fields caused by hard magnetic parts of the vehicle can be compensated for by way of a suitable correction method. For an example of such a correction method, the cited document refers to EP-A-0 067 338 corresponding to U.S. Pat. No. 4,416,067. In accordance with said method, the vehicle must be driven around in a circle, measurements then being performed to enable calculation of correction factors. Such correction methods are comparatively satisfactory when the magnetization of the parts of the body causing the disturbance is substantially constant. In that case the comparatively complex and time-consuming correction method need be performed only once, for example prior to the beginning of a ride in the vehicle.

However, it has been found in practice that the remanent magnetism present in parts of the body can change comparatively easily. The magnetization of such parts of the body, therefore, changes comparatively often and in an unpredictable manner. This takes place, for example when the vehicle enters an external magnetic field. Such magnetic fields occur in the vicinity of large steel constructions such as bridges, freight trucks or buildings involving a large amount of structural steel. Large magnetic fields also occur in the vicinity of electric leads carrying large direct currents, for example, current leads for trains or trams. For example, currents up to 4000 A can flow through the overhead wires of railroads, giving rise to magnetic fields having a horizontal component of $4.4 \times 10^{-4}$T. For the purpose of comparison it is to be noted that the terrestrial magnetic field in the Netherlands has a horizontal component of $2.7 \times 10^{-5}$T. Under the influence of such external magnetic fields, the magnetization of ferromagnetic pans of the body changes continuously. On the other hand, a partial demagnetization of such parts can occur, for example due to shocks and temperature cycles and magnetic alternating fields which occur, for example in the vicinity of high-voltage cables.

SUMMARY OF THE INVENTION

It is an object of the invention to provide a device of the kind set forth in which the effects of a variable magnetization of the body on the measuring accuracy are substantially reduced without necessitating the use of complex and time-consuming correction procedures. To achieve this, the device in accordance with the invention is characterized in that the wall portion of the body in the vicinity of the magnetic field sensor is magnetically stabilized.

The term "magnetically stabilized" is to be understood to mean herein that the magnetic induction at a distance of approximately 1 cm from the relevant wall portion does not deviate by more than approximately $0.02 \times 10^{-4}$T from a desired value after exposure of the relevant wall portion to an external magnetic field of approximately $2 \times 10^{-4}$T. This deviation amounts to approximately 10% of the variation that would be incurred by a non-stabilized wall portion in the same circumstances. As a result of this stabilization, the variation of the magnetization of the relevant wall portion under the influence of the external magnetic fields occurring in the vicinity in which vehicles usually operate no longer has a significant effect on the measuring results.

A preferred embodiment of the device in accordance with the invention is characterized in that the relevant wall portion is included in a magnetic circuit which also includes at least a magnet. In this embodiment a controlled magnetic field can be generated in the wall portion, so that the effect of external magnetic fields is substantially reduced. The magnet may be a permanent magnet as well as an electromagnet.

A first version of this preferred embodiment is characterized in that the magnetic circuit also comprises a yoke which has an approximately U-shaped cross-section and which is made of soft magnetic or ferromagnetic material, the free ends of the limbs of said yoke facing the relevant wall portion and, the yoke being at least partly enclosed by an electric coil in order to form an electromagnet.

A further example of a method for stabilizing a wall portion of a body in the latter device is characterized in that a direct current having a predetermined current direction and a predetermined value is conducted through the coil in order to bring the wall portion into a first state of magnetic saturation, after which the current is gradually reduced to zero. The magnetic circuit thus enters a physically well-defined state. The remanent magnetism which is present in the magnetic circuit after the execution of this method, and which has been induced in a controlled manner prevents influencing of the relevant wall portion by external magnetic fields to a high degree.

A further version of said method is characterized in that subsequently a direct current having a second current direction, opposed to the first current direction, and a predetermined value is conducted through the coil in order to bring the wall portion into a second state of magnetic saturation, after which the current is gradually reduced to zero. The remnant magnetism thus caused is directed oppositely to the previously induced remnant magnetism and the effect of the remanent magnetism on the measuring results can be readily eliminated by performing a measurement in both states of remanent magnetism and by adding the results.

A further version of said method is characterized in that before the wall portion is brought into the first state of magnetic saturation, an alternating current of gradually decreasing amplitude is conducted through the coil in order to demagnetize the magnetic circuit. Any unpredictable magnetization present due to external magnetic fields is thus neutralized and the magnetic circuit is brought into a suitably defined initial state for the magnetization.

A second version of said preferred embodiment of the device in accordance with the invention is characterized in that the magnetic circuit also comprises a yoke of a soft magnetic material and a number of permanent magnets. As a result of the presence of the permanent magnets, the relevant wall portion is magnetized in a defined manner so that external magnetic fields can influence the magnetization thereof to a substantially smaller extent only. A particularly practical and readily manufacturable version of this embodiment is characterized in that the yoke extends approximately parallel to the relevant wall portion, the permanent magnets connecting the yoke to the wall portion and being polarized so that the magnetic fields generated in the wall portion by said magnets intensify one another.

A further preferred embodiment of the device in accordance with the invention is characterized in that the relevant wall portion contains a hard magnetic material. This can be realised in a very simple and inconspicuous manner by covering at least one side of the relevant wall portion with a layer of lacquer containing grains of a hard magnetic material (for example, ferroxdure).

BRIEF DESCRIPTION OF THE DRAWING

These and other aspects of the invention will be described in detail hereinafter with reference to the drawing, in which.

DESCRIPTION OF THE PREFERRED EMBODIMENTS

Figure 1:
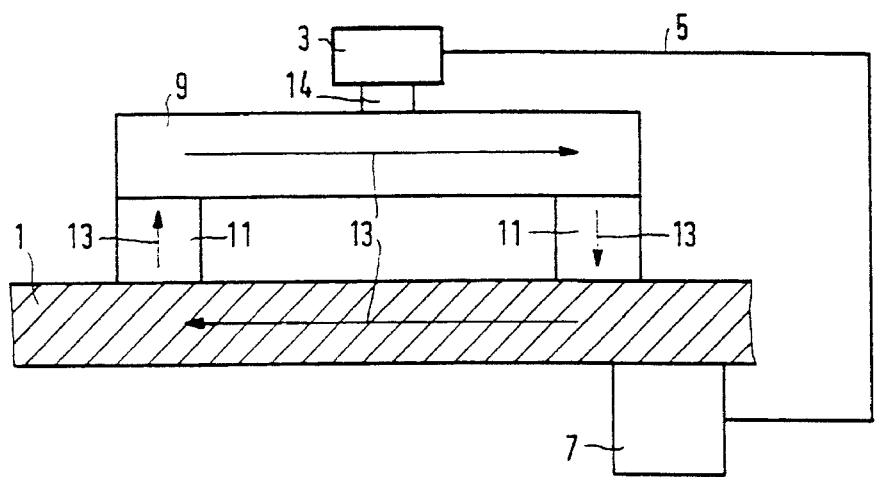
FIG. 1 shows diagrammatically a first embodiment of a device in accordance with the invention.

FIG. 1 is a sectional view of a portion 1 of an outer wall of a body of a vehicle, for example a car. At least the wall portion 1 shown (in this case a part of the roof of the car) is made of a ferromagnetic material, for example steel. A magnetic field sensor 3, forming part of a magnetic compass as described, for example in U.S. Pat. No. 4,429,469, is arranged in the immediate vicinity of the wall portion 1. Via a cable 5, the sensor 3 is connected to a known signal processing circuit 7 which is preferably situated within the vehicle. Evidently, the magnetic field sensor 3 which is arranged outside the vehicle in the present example can also be arranged inside the vehicle, for example between the roof of the car and its lining.

The wall portion 1 shown is included in a magnetic circuit which, in the present embodiment, also comprises a yoke 9 which consists of a number of stacked plates of a soft magnetic material (for example, silicon iron) and two or more permanent magnets 11, for example of Ferroxdure magnetic material. The magnets 11 connect the wall portion 1 to the yoke 9 and are polarized so that the magnetic fields generated in the wall portion and the yoke by the magnets intensify one another. The direction of the magnetization thus generated in the various pans of the magnetic circuit is denoted by arrows 13. The magnetic sensor 3 is mounted over the yoke 9 by way of a support 14, so that it is rigidly connected to the wall portion 1. If desired, the sensor 3 can also be accommodated in a recess (not shown) provided in the yoke 9 for this purpose. In that case the yoke 9 may comprise a number of stacked, rectangular frames of a soft magnetic material, for example a permanent magnet 11 being arranged at each corner of the yoke. As is shown, the magnetic circuit and the sensor 3 can be provided on top of the roof (i.e. outside the vehicle), but it is alternatively possible to mount the magnetic circuit and/or the sensor on the lower side of the roof (i.e. within the vehicle).

Figure 2A:
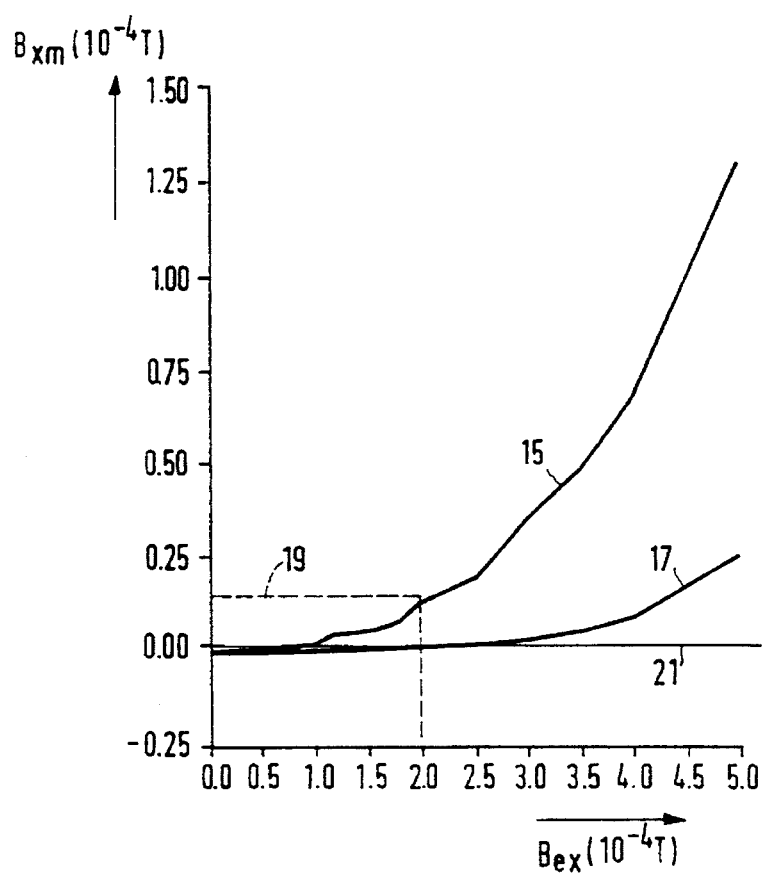
FIGS. 2A and 2B show graphs illustrating the operation of the device shown in FIG. 1.
Figure 2B:
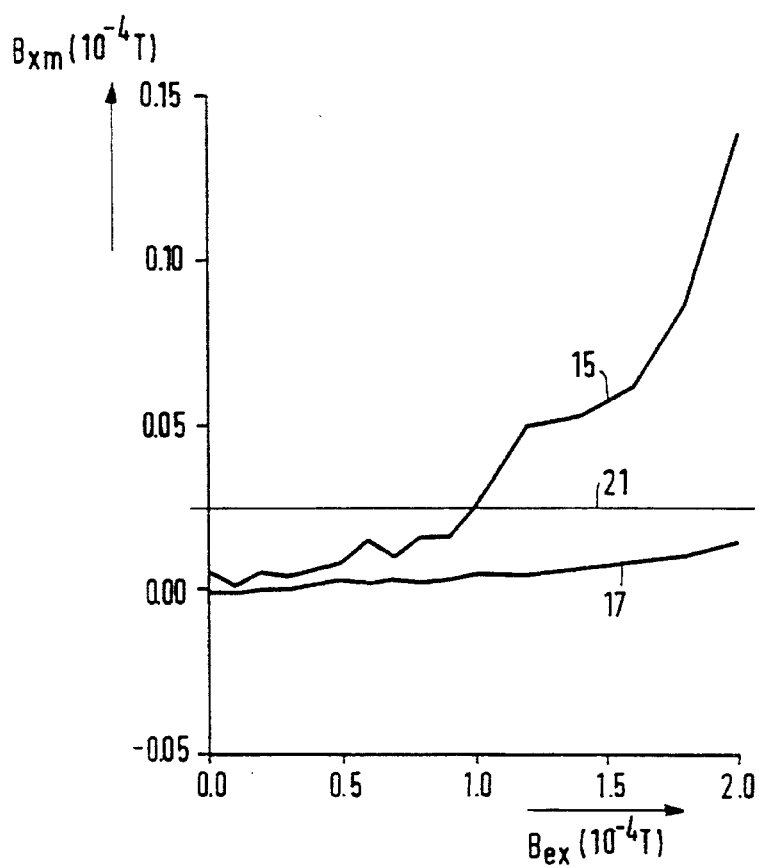

FIG. 2 shows the effect of the described construction on the horizontal component $B_{xm}$ of the magnetic induction, measured 1 cm above the roof of a car and induced by an external DC magnetic field $B_{ex}$. The curve 15 represents the variation of $B_{xm}$ after the roof has been exposed to an external field $B_{ex}$ without special steps being taken, and the curve 17 represents the same variation after installation of a magnetic circuit as shown in FIG. 1. In this case the magnetic circuit consisted of four NdFeB magnets 11 of $13 \times 7 \times 3$ mm$^3$, magnetized along the short axis, and a soft magnetic yoke 9 consisting of two plates ($120 \times 120 \times 0.5$ mm$^3$) and six frames ($120 \times 120 \times 0.5$ mm$^3$ with an opening of $80 \times 80$ mm$^2$). FIG. 2A shows the effect of external fields of between 0 and $5 \times 10^{-4}$ T and FIG. 2B shows, at an increased scale, a part 19 of FIG. 2A with external fields of between 0 and $2 \times 10^{-4}$ T. The Figures also show a horizontal line 21 which corresponds to a $B_{xm}$ of $0.025 \times 10^{-4}$ T, i.e. approximately 10% of the value of the terrestrial magnetic field. The Figures show that an external field of $5 \times 10^{-4}$ T causes a disturbance of $1.25 \times 10^{-4}$ T if no steps are taken. After installation of the magnetic circuit, the disturbance amounts to only $0.255 \times 10^{-4}$ T, implying an improvement by a factor 5. If no steps are taken, as from $1 \times 10^{-4}$ T an external field causes an induction of more than 10% of the terrestrial field (point of intersection of the curves 15 and 21); after installation of the magnetic circuit, an external field of more than $2.5 \times 10^{-4}$ T will be required to do so. It will be evident that the installation of the magnetic circuit results in a substantial improvement of the stability of the magnetization of the car roof in respect of DC disturbances.

The installation of the magnetic circuit causes stray fields of approximately from $3 \times 10^{-5}$ to $5 \times 10^{-5}$ T within the car, directly below the roof of the car. These fields are so small that there is no risk of small iron objects in the car being attracted by the roof.

The sensitivity of the sensor 3 to the terrestrial field is reduced by the introduction of the magnetic circuit. In the absence of the circuit, rotation of the vehicle through 180° leads to a shift of $2 \times 5 \times 10^{-5}$ T in the measured field strength. After the introduction of the circuit, this signal has decreased to $1 \times 10^{-5}$ T. As the disturbances have been reduced by a factor 5 as described above, the net improvement of the sensitivity of the sensor signal thus amounts to a factor 2. The decrease of the sensitivity to the terrestrial magnetic field is due to the capture of a part of the flux by the yoke 9. This effect occurs whenever the sensor 3 is situated in the direct vicinity of a non-saturated soft magnetic yoke. It is possible to saturate the yoke 9, for example by reducing its thickness while maintaining the same overall strength of the permanent magnets 11, but on the one hand the stray field in the vehicle is then substantially increased and on the other hand the permanent magnetization of the roof decreases, resulting in a higher sensitivity of the magnetization to disturbances.

The described method thus enables an improvement of the stability of the compass signal by approximately a factor 2. The described configuration is simple, rugged and compact (the thickness is approximately 1 cm). The permanent magnetization of a part of the roof could be a drawback.

Figure 3:
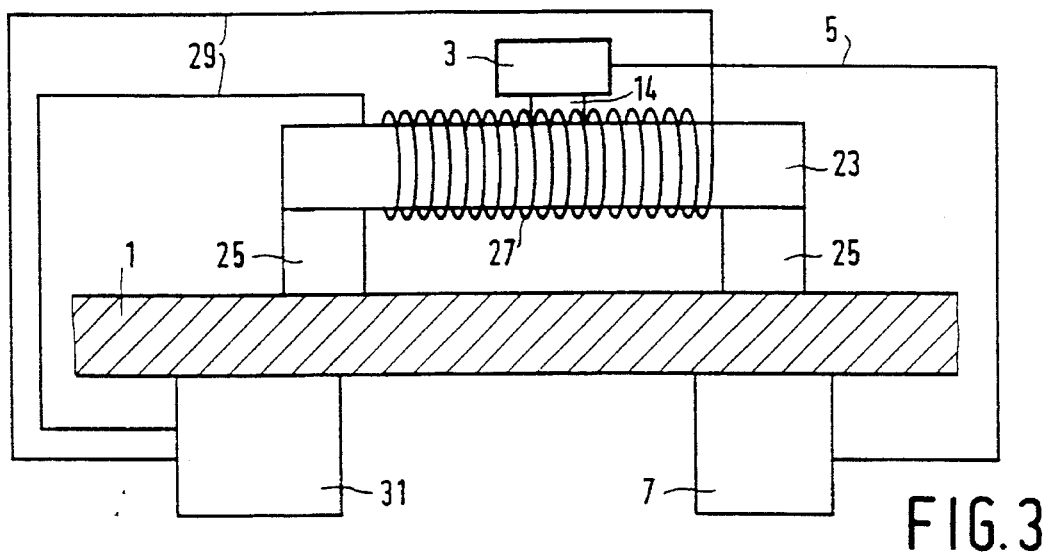
FIG. 3 shows diagrammatically a second embodiment of a device in accordance with the invention.

FIG. 3 shows an embodiment of a device comprising a magnetic circuit enabling a substantially smaller magnetization of the roof. Corresponding components are denoted by the same references as used in FIG. 1. The magnetic circuit comprises an electromagnet whereby the relevant wall portion 1 can be brought into a predetermined magnetic state. The circuit comprises a yoke which has an approximately U-shaped cross-section and which is made of a soft magnetic material, said yoke comprising a base portion 23 which may be constructed in the same way as the yoke 9 shown in FIG. 1 and also comprises a number (preferably two) of limbs 25, the free ends of which face the wall portion 1. The base portion 23 is surrounded by an electric coil 27 in the form of a solenoid, thus forming an electromagnet. The coil 27 is connected, via two connection wires 29, to a power supply apparatus 31 capable of supplying the coil with a variable current. The dimensions of the base portion 23 are, for example 120×185×1 mm$^3$ and the coil 27 comprises, for example 4000 turns per meter. When the power supply apparatus 31 supplies a current of 1 A, the coil thus induces a magnetic field of 4000×½ A/m in the yoke 25, 27. In the present embodiment, the field strength required to saturate the metal of the portion 1 of the car roof amounted to approximately 6000 A/m. During a test the following three steps were executed to stabilize the wall portion 1:

1) The power supply apparatus supplied the coil 27 with an alternating current having a frequency of 50 Hz; this current initially was 3 A and gradually decreased to zero. The wall portion 1 was thus demagnetized.

2) Subsequently, the coil 27 received a direct current of 3 A which was gradually decreased to zero. The wall portion 1 was thus brought into a first state of magnetic saturation, after which it assumed a state of remnant magnetization where $(H, M)=(0, -M_r)$. Therein, H is the magnetic field strength and M is the magnetization in the wall portion 1. $M_r$ is the remnant magnetization.

3) Finally, the coil received a direct current of −3 A which was gradually reduced to zero. The wall portion 1 was thus brought into a second state of magnetic saturation, after which it assumed a state of remnant magnetization, where $(H, M)=(0, M_r)$.

Subsequent to the first one of the above steps, the magnetization M of the wall portion 1 is of the order of magnitude of the terrestrial field and hence the magnetic induction caused by the wall portion at the area of the sensor 3 is also of the order of magnitude of the terrestrial field. After the steps 2 and 3, the magnetization of the wall portion 1 amounts to $-M_r$ and $M_r$, respectively, and the induction caused thereby at the area of the sensor amounts to $-B_r$ and $B_r$, respectively. The step 2 need not necessarily be preceded by the step 1. The state of remanence can in principle be reached from any arbitrary initial state. Executing the step 1 in advance, however, offers the advantage that the initial state is thus suitably defined. The magnetic induction $B_a$ caused by the terrestrial field at the area of the sensor 3 is then measured in the remanent state of the material of the wall portion 1, it being evident that correction must be made for the induction $B_r$ or $-B_r$ caused by the remnant magnetization. This can be readily achieved by first performing a measurement after completion of the step 2. A total magnetic induction $B=B_a-B_r$ is then measured. Subsequently, step 3 is executed, after which the total magnetic induction $B=B_a+B_r$ is measured. $B_r$ can be eliminated by adding the results of these two measurements, so that $B_a$ is accurately determined. It is also possible to subtract the results of the two measurements, resulting in the value of $B_r$. This value can subsequently be used as a correction quantity for the measurements undertaken after execution of only step 2 or 3. In this respect it is assumed that $B_r$ does not change between measurements. Because $B_r$ may vary over prolonged periods of time, for example due to temperature fluctuations or ageing of the material, $B_r$ should be determined again at regular intervals. However, this is not objectionable because this determination is particularly simple. During the measurement no current flows through a coil 27 and the yoke 23, 25 forms a short-circuit for the magnetization $M_r$ so that the value of $B_r$ is limited. Because the yoke cannot be saturated in this state, in the present embodiment it also absorbs a part of the terrestrial field, resulting in a reduction of the useful signal produced by the sensor.

In order to test the described system, in an embodiment in which the yoke 23, 25 was made of a soft magnetic material (soft magnetic silicon iron) the magnetic induction was measured at 1 cm above the car roof after each of the above steps. Subsequently, an interference field of 5×10$^{-4}$T was applied, after which the measuring series was repeated. During the repetition of the measuring series, each time first a measurement was performed with the vehicle in a first position (position 1), followed by a measurement after rotation of the vehicle through 180°. In order to examine the reproducibility, two measurements were performed in each point with remnant magnetization. The result is given in the below Table, the measuring results being stated in units of 10$^{-7}$T. By adding the mean value of the two measurements after a premagnetization with +A to the corresponding mean value after a premagnetization with −3 A and by dividing the difference by 2, the induction $B_a$ caused by the terrestrial magnetic field is found as described above. Similarly, by dividing the sum of the mean values by 2, the value of the induction $B_r$ caused by the remnant magnetization is found. The values of $B_a$ and $B_r$ thus found are also stated in the Table.

TABLE

|  | Before interference field (position 1) | After interference field (position 1) | After interference field (position 2) |
|---|---|---|---|
| Roof demagnetized | −135 | −110 | −86 |
| Premagnedized with +A | −565 | −565 | −507 |
|  | −568 | −568 | −515 |
| Premagnetized with −3 A | 262 | 258 | 318 |
|  | 257 | 254 | 317 |
| $B_a$ | −153.5 | −155.25 | −96.8 |
| $B_r$ | 413 | 411.25 | 414.25 |

The variation of the measured value of $B_a$, caused by the rotation of the vehicle through 180° (the difference between $B_a$ in the position 1 and $B_a$ in the position 2) amounts to 56.7×10$^{-7}$T before application of the interference field and to 58.8×10$^{-7}$T after application of the interference field. The difference caused by the interference fields, therefore, is smaller than 2×10$^{-7}$T, which is approximately a factor 600 better than if no precautions are taken. The difference is of the same order of magnitude as the reproducibility of the measurements. The measured value is approximately a factor 4 to 5 smaller than the actual value of the inductance caused by the terrestrial field (2.7×10$^{-5}$T), so the sensitivity is reduced by a factor of from 4 to 5 by provision of the yoke 23, 25. The net increase of the stability is thus a factor 80 to 100. The sensitivity could be further increased by providing a flux concentrator (not shown), but that would also cause a stronger coupling in of the stray field of the roof. An embodiment in which the yoke 23, 25 is made of a ferromagnetic material (for example, sheet steel) offers the advantage that the disturbing induction due to the magnetization of the roof could be substantially eliminated. The measured value of $B_a$ is then only a factor of from 1 to 2 smaller than the actual value. The net increase of the stability is then approximately a factor 400.

Figure 4:
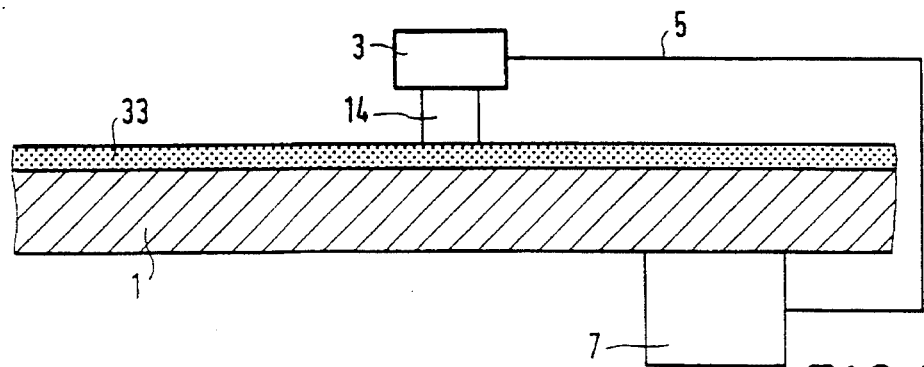
FIG. 4 shows diagrammatically a third embodiment of a device in accordance with the invention.

FIG. 4 shows an embodiment of the device in accordance with the invention in which the wall portion 1 situated in the direct vicinity of the sensor 3 is magnetically stabilized because it contains a hard magnetic material. This could be realised by using a hard magnetic material (for example, Ferroxdure magnetic material) for manufacturing the entire wall portion or a part thereof, but the solution shown in FIG. 4 is preferred for practical reasons, the wall portion 1 then being made of a customary sheet steel covered with a layer of lacquer 33 containing grains of a hard magnetic material. The lacquer contains uniformly distributed grains of Ferroxdure magnetic material of a size of the order of magnitude of 1 mm. The hard magnetic material has the property that its magnetization state is difficult to change by the normally occurring external disturbing magnetic fields, so that the disturbing magnetic induction caused by the relevant wall portion 1 at the area of the sensor is substantially constant.

We claim:

1. A method for determining the orientation of a vehicle at various locations in an area of operation by sensing an external magnetic field having lines of force oriented in a predetermined direction, said vehicle having an outer body portion comprising a ferromagnetic material, said method comprising:
   a. producing in the outer body portion a stabilizing magnetic field having a first magnitude for bringing the outer body portion into a state of magnetic saturation in a first direction;
   b. reducing the stabilizing magnetic field from a first magnitude to a predetermined lower magnitude;
   c. increasing the stabilizing magnetic field to a second magnitude for bringing the outer body portion into a state of magnetic saturation in a second direction oriented opposite to the first direction; and
   d. sensing a component of said external magnetic field which is induced in the outer body portion.

2. A method as in claim 1 where the predetermined lower magnitude is substantially equal to zero.

3. A method for determining the orientation of a vehicle at various locations in an area of operation by sensing an external magnetic field having lines of force oriented in a predetermined direction, said vehicle having an outer body portion comprising a ferromagnetic material, said method comprising:
   a. producing a magnetic field in the outer body portion for stabilizing remanent magnetism of said body portion, said magnetic field being alternated between first and second directions and, during said alternations, being periodically reduced from a first magnitude to a predetermined lower magnitude; and
   b. sensing a component of said external magnetic field which is induced in the outer body portion.

4. Apparatus for determining the orientation of a vehicle at various locations in an area of operation by sensing an external magnetic field having lines of force oriented in a predetermined direction, said vehicle having an outer body portion comprising a ferromagnetic material, said apparatus comprising:
   a. means for producing in the outer body portion a stabilizing magnetic field having a first magnitude for bringing the outer body portion into a state of magnetic saturation in a first direction;
   b. means for reducing the stabilizing magnetic field from a first magnitude to a predetermined lower magnitude;
   c. means for increasing the stabilizing magnetic field to a second magnitude for bringing the outer body portion into a state of magnetic saturation in a second direction oriented opposite to the first direction; and
   d. means for sensing a component of said external magnetic field which is induced in the outer body portion.

5. Apparatus as in claim 4 where the predetermined lower magnitude is substantially equal to zero.

6. Apparatus for determining the orientation of a vehicle at various locations in an area of operation by sensing an external magnetic field having lines of force oriented in a predetermined direction, said vehicle having an outer body portion comprising a ferromagnetic material, said apparatus comprising:
   a. means for producing a magnetic field in the outer body portion for stabilizing remanent magnetism of said body portion, means for alternating said magnetic field between first and second directions and, means for periodically reducing said magnetic field from a first magnitude to a predetermined lower magnitude during said alternations; and
   b. means for sensing a component of said external magnetic field which is induced in the outer body portion.

* * * * *